(12) United States Patent
Stratton et al.

(10) Patent No.: US 10,766,971 B2
(45) Date of Patent: *Sep. 8, 2020

(54) SYSTEM FOR MAKING AND USING A COMPOSITION OF MATTER

(71) Applicant: ECONOMY MUD PRODUCTS COMPANY, Houston, TX (US)

(72) Inventors: Samuel Stratton, Houston, TX (US); Walter White, Houston, TX (US); Matthew White, Houston, TX (US)

(73) Assignee: Economy Mud Products Company, Houston, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/230,827

(22) Filed: Dec. 21, 2018

(65) Prior Publication Data

US 2019/0367641 A1 Dec. 5, 2019

Related U.S. Application Data

(63) Continuation of application No. PCT/US2018/036130, filed on Jun. 5, 2018.

(51) Int. Cl.

| | |
|---|---|
| *B01F 3/12* | (2006.01) |
| *C08B 37/00* | (2006.01) |
| *C08J 3/12* | (2006.01) |
| *B01J 19/00* | (2006.01) |
| *B01J 23/04* | (2006.01) |

(52) U.S. Cl.

CPC ........ *C08B 37/0096* (2013.01); *B01F 3/1207* (2013.01); *B01J 19/0006* (2013.01); *C08J 3/12* (2013.01); *B01J 23/04* (2013.01); *B01J 2219/00157* (2013.01); *B01J 2219/00166* (2013.01); *C08J 2305/00* (2013.01)

(58) Field of Classification Search
None
See application file for complete search history.

(56) References Cited

U.S. PATENT DOCUMENTS

| | | | | |
|---|---|---|---|---|
| 3,483,121 | A * | 12/1969 | Jordan | C08B 37/0096 507/217 |
| 5,801,116 | A * | 9/1998 | Cottrell | A61L 15/28 502/401 |
| 8,268,757 | B2 * | 9/2012 | Weaver | C08B 37/0096 166/305.1 |
| 8,614,172 | B2 * | 12/2013 | Weaver | C08B 37/0096 166/305.1 |
| 9,029,298 | B2 * | 5/2015 | Weaver | C08B 37/0096 507/210 |
| 2002/0052298 | A1 * | 5/2002 | Chowdhary | C08B 37/0096 507/209 |

(Continued)

*Primary Examiner* — Peter A Salamon
(74) *Attorney, Agent, or Firm* — Rao DeBoer Osterrieder, PLLC; John M. DeBoer (57) ABSTRACT

A system for making and using a ground product that includes one or more of: a reactor operated to react a guar split with a reagent at a reaction temperature in a range of 120° F. to 180° F. to form a guar derivative, and a treatment and transfer section for optionally treating the guar derivative and transferring the guar derivative to a co-grinder. The co-grinder is operably associated with a heated vacuum system and is operated to co-grind an acid with the guar derivative to form a ground product.

18 Claims, 1 Drawing Sheet

(56) References Cited

U.S. PATENT DOCUMENTS

| | | | | |
|---|---|---|---|---|
| 2003/0008780 | A1* | 1/2003 | Chowdhary | C08B 37/0096 |
| | | | | 507/209 |
| 2003/0054963 | A1* | 3/2003 | Chowdhary | C09K 8/04 |
| | | | | 507/209 |
| 2006/0151173 | A1* | 7/2006 | Slabaugh | C09K 8/90 |
| | | | | 166/308.2 |
| 2010/0000735 | A1* | 1/2010 | Weaver | C09K 8/60 |
| | | | | 166/280.2 |
| 2012/0270759 | A1* | 10/2012 | Weaver | C08B 37/0096 |
| | | | | 507/211 |
| 2013/0038455 | A1* | 2/2013 | Chowdhary | G06Q 10/0833 |
| | | | | 340/612 |
| 2014/0057815 | A1* | 2/2014 | Weaver | C09K 8/68 |
| | | | | 507/211 |
| 2019/0367641 | A1* | 12/2019 | Stratton | B01F 3/1207 |
| 2019/0367802 | A1* | 12/2019 | Stratton | C08B 37/0096 |

* cited by examiner

SYSTEM FOR MAKING AND USING A COMPOSITION OF MATTER

CROSS-REFERENCE TO RELATED APPLICATIONS

This application is a bypass continuation of PCT Application Ser. No. PCT/US18/36130, filed on Jun. 5, 2018. The disclosure of each application is hereby incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates to making a composition of matter useful to improve performance of hydraulic fracturing. Particular embodiments pertain to making and using a natural polymer-based additive, which may be useful as a friction reducer in a high-brine solution used in fracking.

Background of the Disclosure

In a stimulation process, such as frac operation, a frac fluid (with varying additives) may be injected into a subterranean formation. In such an operation a large amount of frac fluid is pumped down a wellbore under high pressure to a depth of anywhere from 1000 feet to 20,000 feet or more, which results in fractures of the surrounding rock formation. The pressure is then relieved allowing valuable hydrocarbonaceous fluids to permeate out through the fractures and into the wellbore, where the fluids can be produced to a surface unit or facility.

Turbulence produced as the frac fluid is pumped through a tubular under pressure results in friction, which increases (in some instances, significantly) the amount of energy required to pump the injection fluid at sufficient speed and pressure.

Additives, including those of a polymeric nature, can be used to alter the rheological properties of the frac fluid so that friction is reduced, thereby reducing consequent energy loss. This type of additive (or combination of ingredients) is conventionally known as a 'friction reducer'. Friction reducers have a wide range of variation in terms of composition, utility, characteristics, and so forth. But in general, a good friction reducer will result in a decrease in friction at small concentrations, will be inexpensive, environmentally approved, and will have high-shear, temperature, and pressure stability.

Various polymers can be used in friction reducers, some being better than others, and the selection of which being further dependent on factors such as formation type and the type of fluid (usually water) available for injection fluid.

A friction reducer does not directly make it easier to produce formation fluids; instead, it typically helps get more frac fluid (and/or proppant) into the formation fractures and reduces the overall energy requirement of the injection process. The reduction in friction means the same energy output can pump more frac fluid into the formation, which means more proppant/sand can be introduced into the fractures (to hold open), and thus more formation fluid (liquid, gas) can permeate out of the formation and into the wellbore.

An additive to frac fluid can also be useful for increasing the viscosity (or carrying capacity) of the frac fluid. This type of additive typically results in the frac fluid having a higher gel strength in order to carry more sand/proppant. Such additives are used to increase overall operation efficiency, meaning less water, less energy, less stress on equipment, smaller equipment, and so forth, to obtain a similar or better result.

Thus, there are significant technical differences in function and purpose between a material used to build viscosity, and that of which reduces friction (or in some instances accomplishes both).

The composition of the additive and choice thereof is thus dependent on what type of function is desired, as well as other variables such as formation properties and the water source. While fresh water may be used, the cost may be high such that other options are considered, including produced water from the formation or previously used water (flowback, recycle, etc.). Whatever the case may be, the water and any contaminants therein can have detrimental effects on additives.

In some instances, a synthetic polymer-based additive may be desired. This type of additive tends to be uncrosslinked and may provide better friction reducing ability, particularly if fresh or cleaner water is available. A common practice is to use a synthetic polymer additive mixed with water to make a frac fluid called "slickwater".

In some instances, a natural polymer-based additive may be desired, such as a guar-based additive. These types of additives tend to be degradable, and better suited for environmental disposal. They tend to be cross-linked. A cross-linked polymer tends to be stronger, and better suited to handle harsher water choices, including salt- or oil-ladened produced water. Natural polymers tend to be selected for their viscosity building ability.

Guar gum has diverse industrial uses including its use as a thickener and/or stabilizer in the textile, food, cosmetic and pharmaceutical industries, and has been given consideration for varied use in the oil and gas industry.

Guar gum comes from a legume-type plant that produces a pod with seeds inside. Upon heating, the seeds 'split' open and expose two endosperm sections, and the germ therebetween. The exposed endosperm sections contain a polymer known as polygalactomannan, or 'gum'. The gum is contained in tiny cells having a water-insoluble cell wall, which may be disrupted to obtain the material, which is usually via some kind of processing in the form of dehusking, milling, screening, roasting, differential attrition, sieving, polishing and so forth. The remnant material is substantially gum, possibly with minor amounts of proteinaceous material, inorganic salts, water-insoluble gum, cell membranes, as well as some residual seedcoat and embryo, which can be further processed and separated.

This resultant gum material develops a high viscosity via hydration of the fluid to be thickened, similar to the action of starch; however, the guar endosperm polymer is much more efficient than starch in developing viscosity.

Guar derivatives are also useful, such as hydroxyalkyl guar, carboxyalkyl guar, carboxyalkyl hydroxyalkyl guar, cationic guar, hydrophobically modified guar, and hydroxypropyl guar (or "HPG").

Other guar and guar derivative applications include, among others, animal litter, explosives, foodstuff, paperstock, synthetic fuel briquettes, shampoo, personal care lotion, household cleaner, diapers, sanitary towels, and adsorbent in food packaging. In such applications, it is known that faster hydration of the guar or guar derivative for any of these applications would be an advantage.

Conventionally linear (no cross-linking), hydrated HPG tends to have characteristics that make it commercially viable in industry for viscosity building. Whereas for friction reducing, particularly for fresh(er) water applications, polyacrylamides have characteristics (e.g., crosslinking) that tend to be viewed as commercially viable. In such an application, HPG is not viewed as commercially practicable or viewed as workable.

However, in certain uses polyacrylamides lose their effectiveness. For example, when high-brine fluids are used, polyacrylamides typically fail. An example of a high-brine fluid is a variant of produced water. The high amount of salt in brine, and particularly high-brine, results in the salt attacking the polyacrylamide via ionic attraction, with the polymer collapsing and becoming ineffective.

Polyacrylamides also have hydration, storage, and transport problems. First, polyacrylamides are large molecules, which means great amounts of energy and equipment are needed in order to hydrate. Next, while powders tend to be a preferred medium because of ease of transport and storage, dry polyacrylamide tends to be prone to clumping and absorbing moisture. This is attributable to particle size, meaning in order to have desired friction reducing effects, the polyacrylamide needs to have fast hydration. To achieve fast hydration, the particle size is smaller; however, smaller particle size results in undesired hydration in storage. Thus, polyacrylamide systems have been largely relegated to use liquid carriers and solvents, which results in higher storage and transport costs.

There is a need in the art for a composition of matter that has fast hydration characteristics that can also be readily storable and transportable in powder form. There is a need for a composition of matter for use as an additive into a frac fluid that can be both friction reducing and viscosity building, or better at one or the other with slight compositional change. There is a need in the art for a cost-effective, expedient, and scalable process that can be used to make a composition of matter for use as an additive into a frac fluid. What is further needed is a natural polymer-based material that can be used with high brine solutions.

SUMMARY

Embodiments herein may be useful for a process for making and/or using a ground product composition of matter that may include one or more steps of: reacting a guar split with at least one reagent at a reaction temperature in a range of 120° F. to 180° F. to form a guar derivative; and treating the guar derivative with at least one of washing and drying to form a resultant treated derivative.

Other embodiments herein may pertain to a system for making and/or using a ground product composition of matter. The system may include a reactor operated with a reaction temperature range of 120° F. to 180° F. The guar split and an at least one reagent may be fed to, and reacted within, the reactor to form a guar derivative.

The system may include a transfer and treatment section operably coupled with the reactor. Accordingly, the guar derivative may be treated and/or transferred.

There may be a co-grinder operably associated with the transfer and treatment section. In aspects, the guar derivative (which may be a treated guar derivative) may be transferred thereto.

The co-grinder may be fed an acid.

The co-grinder may operate to grind the guar derivative and the acid together to form a ground product. The ground product may be characterized by or have the physical property of at least 90% by weight of a given quantity thereof having an average particle bulk diameter less than or equal to 74 microns.

The system may include a heated vacuum system operably associated with the co-grinder.

The heated vacuum system may include one or more of: a combustion burner; a dust collector configured for use as a dryer; and a blower configured for pulling a vacuum.

The reactor may be a batch reactor. The reactor may be operated with a batch reaction time in the range of 1.5 hours to 2.5 hours.

The system may include a caustic feed source comprising a caustic material. The caustic feed source may be in communication with the reactor. Accordingly, the caustic material may be fed to the reactor. The acid may be powdered carboxylic acid.

The system may include one or more mixers, which may be (but need not be) inline or static mixers. The system may thus include such a first blend mixer. The first blend mixer may be operated to mix the ground product (optionally treated prior thereto) with an at least one other constituent to form a blend product.

The system may include another mixer, such as a second blend mixer. The second blend mixer operated to mix each of the blend product with a water stream fed thereto. The water stream may have a salinity value in the range of about 100,000 ppm to about 300,000 ppm total dissolved solids (TDS).

In aspects, the ground product may be in substantially dry powdered form. In other aspects, the ground product may be in slurry or liquidious form.

The system may have a plurality of predetermined operating parameters. The system may include the combustion burner operated with a combustion temperature output of about 400° F. to about 600° F. In aspects, the burner is operated with the combustion temperature output of about 600° F. The co-grinder may be operated with an exhaust temperature in a range of about 175° F. to about 185° F. The dust collector may be operated with an exhaust temperature range of about 170° F. to about 175° F.

The system may include a hydration unit. The hydration unit may be operated to hydrate at least about 80% of the ground product in one minute or less.

Yet other embodiments of the disclosure pertain to a system for making and/or using a ground product composition of matter that may include a reactor. The reactor may be operated with a reaction temperature range of 120° F. to 180° F.

In aspects, each of a guar split and at least one reagent may be fed to, and reacted within, the reactor to form a guar derivative.

The system may include a transfer and treatment section operably coupled with the reactor. In this respect, the guar derivative may be optionally treated, and transferred, such as to a co-grinder.

The co-grinder may be operably associated with the transfer and treatment section. The guar derivative (which may be optionally treated) may be transferred thereto. The co-grinder may also be fed a powdered acid (such as from an acid source). The co-grinder may operate to grind the guar derivative and the acid together to form a ground product.

In aspects, the ground product may be characterized by (or have the physical property of) at least 90% by weight of a given quantity thereof having an average particle bulk diameter less than or equal to 74 microns.

The co-grinder may be operated with an exhaust temperature in a range of about 175° F. to about 185° F.

The system may include a vacuum system operably associated with the co-grinder. The vacuum system may include one or more of: a combustion burner, a dust collector, and a blower. In aspects, the dust collector may be operated as dryer to dry the ground product. The blower may be operated to pull a vacuum on at least one of the reactors and the co-grinder.

The guar derivative may be formed with the reactor operating with a reaction time in the range of 1.5 hours to 2.5 hours.

The system may include a caustic feed source comprising a caustic material. The caustic feed source may be in communication with the reactor. The caustic material may be fed to the reactor. The powdered acid may include carboxylic acid.

The system may include one or more mixers, any of which may be inline, static, and so forth. Thus, there may be a first blend mixer. In aspects, the first blend mixer may be operated to mix the ground product with an at least one other constituent to form a blend product.

The system may include another or a second blend mixer. The second blend mixer may be operated to mix either or both of the blend product and the ground product with a water stream. The water stream may have a range of about 100,000 ppm to about 300,000 ppm total dissolved solids (TDS).

In aspects, the ground product may be in substantially dry powdered form.

In aspects, the ground product may be in slurry or liquidious form.

The combustion burner may be operated with a combustion temperature output of about 400° F. to about 700° F. In aspects, the combustion temperature output may be about 600° F.

The system may include a hydration unit. The hydration unit may be operated to hydrate at least about 80% of the ground product in one minute or less.

These and other embodiments, features and advantages will be apparent in the following detailed description and drawings.

BRIEF DESCRIPTION OF THE DRAWINGS

A full understanding of embodiments disclosed herein is obtained from the detailed description of the disclosure presented herein below, and the accompanying drawings, which are given by way of illustration only and are not intended to be limitative of the present embodiments, and wherein.

DETAILED DESCRIPTION

Herein disclosed are novel apparatuses, systems, and methods that pertain to a polymeric-based additive for use in wellbore fluid, details of which are described herein. It has been discovered that a natural polymer.

Embodiments of the present disclosure are described in detail with reference to the accompanying Figures. In the following discussion and in the claims, the terms "including" and "comprising" are used in an open-ended fashion, such as to mean, for example, "including, but not limited to . . . ". While the disclosure may be described with reference to relevant apparatuses, systems, and methods, it should be understood that the disclosure is not limited to the specific embodiments shown or described. Rather, one skilled in the art will appreciate that a variety of configurations may be implemented in accordance with embodiments herein.

Although not necessary, like elements in the various figures may be denoted by like reference numerals for consistency and ease of understanding. Numerous specific details are set forth in order to provide a more thorough understanding of the disclosure; however, it will be apparent to one of ordinary skill in the art that the embodiments disclosed herein may be practiced without these specific details. In other instances, well-known features have not been described in detail to avoid unnecessarily complicating the description. Directional terms, such as "above," "below," "upper," "lower," "front," "back," etc., are used for convenience and to refer to general direction and/or orientation, and are only intended for illustrative purposes only, and not to limit the disclosure.

Connection(s), couplings, or other forms of contact between parts, components, and so forth may include conventional items, such as lubricant, additional sealing materials, such as a gasket between flanges, PTFE between threads, and the like. The make and manufacture of any particular component, subcomponent, etc., may be as would be apparent to one of skill in the art, such as molding, forming, press extrusion, machining, or additive manufacturing. Embodiments of the disclosure provide for one or more components to be new, used, and/or retrofitted to existing machines and systems.

Various equipment may be in fluid communication directly or indirectly with other equipment. Fluid communication may occur via one or more transfer lines and respective connectors, couplings, valving, and so forth. One or more valves may need to be opened so that respective components transfer into the gun assembly. Fluid movers, such as pumps, may be utilized as would be apparent to one of skill in the art.

Numerical ranges in this disclosure may be approximate, and thus may include values outside of the range unless otherwise indicated. Numerical ranges include all values from and including the expressed lower and the upper values, in increments of smaller units. As an example, if a compositional, physical or other property, such as, for example, molecular weight, viscosity, melt index, etc., is from 100 to 1,000. it is intended that all individual values, such as 100, 101, 102, etc., and sub ranges, such as 100 to 144, 155 to 170, 197 to 200, etc., are expressly enumerated. It is intended that decimals or fractions thereof be included. For ranges containing values which are less than one or containing fractional numbers greater than one (e.g., 1.1, 1.5, etc.), smaller units may be considered to be 0.0001, 0.001, 0.01, 0.1, etc. as appropriate. These are only examples of what is specifically intended, and all possible combinations of numerical values between the lowest value and the highest value enumerated, are to be considered to be expressly stated in this disclosure. Numerical ranges are provided within this disclosure for, among other things, the relative amount of reactants, surfactants, catalysts, etc. by itself or in a mixture or mass, and various temperature and other process parameters.

The term "frac operation" as used herein can refer to fractionation of a downhole well that has already been drilled. 'Frac operation' can also be referred to and interchangeable with the terms fractionation, hydraulic fracturing, hydrofracturing, hydrofracking, fracking, fraccing, and frac. A frac operation can be land or water based.

The term "frac fluid" as used herein can refer to a fluid injected into a well as part of a frac operation. Frac fluid is often characterized as being largely water, but with other constituents such as proppant, friction reducers, and other additives or compounds. 'Frac' can be short for fracking, fracturing and other related terms. The term 'frac fluid' can be analogous to injection fluid, and other comparable terms of the art. The composition of the frac is often depends on numerous factors, with the ultimate goal being to improve the results of the frac operation and the productivity of the well. This typically occurs from the frac fluid being pumped down a wellbore and out into a subterranean formation in a suitable amount and pressure to cause fracturing in the surrounding rock.

The term "water" as used herein can refer to the main constituent for a frac fluid, and can include fresh water, seawater, produced water, treated variations thereof, mixes thereof, etc., and can further include impurities, dissolved solids, ions, salts, minerals, and so forth. Water for the frac fluid can also be referred to as 'frac water'.

The term "produced water" as used herein can refer to water recovered from a subterranean formation or other area near the wellbore. Produced water can include 'flowback water', which is water recovered from the subterranean formation after a frac operation.

The term "friction reducer" as used herein can refer to a chemical additive that alters fluid rheological properties to reduce friction associated with a fluid as it flows through tubulars or similar restrictions. The use of a friction reducer is intended to, among other things, reduce losses attributable to the effects of the friction. A hypothetical example of 'loss' can be the extra energy needed for a pump to pump a fluid without a friction reducer into a subterranean formation versus the reduced energy needed to pump the same amount of the same fluid having the added friction reducer.

The term "natural polymer-based friction reducer" as used herein can refer to a friction reducer characterized as having a 'natural' polymer as a constituent. A guar-based polymer (and/or copolymer) is an example of a natural polymer known to be useful for a friction reducer. A natural polymer-based friction reducer may have a characteristic of being cross-linked.

The term "synthetic polymer-based friction reducer" as used herein can refer to a friction reducer characterized as having a 'synthetic' or man-made polymer as a constituent. An acrylamide-based polymer (and/or copolymer) is an example of a synthetic polymer known to be useful for a friction reducer.

The term "crosslinked" as used herein can refer to polymer chains that have multiple bonds, such as covalent or ionic bonds, linking them together. Cross-links in chains can be formed by initiating a chemical reaction, including with various mediums such as heat, pressure, change in pH, radiation, and so forth. For example, mixing of an unpolymerized or partially polymerized resin with specific chemicals (e.g., crosslinking reagents) can result in a chemical reaction that forms cross-links.

The term "proppant" as used herein can refer to particulate material added to a frac fluid that is ultimately intended to maintain space between in the formed fractures.

The term "slickwater" (or "slick water") as used herein can refer to a frac fluid having a synthetic polymer-based friction reducer. Conventional slickwater frac fluid solutions can be characterized as having lower viscosity and proppant carrying capability, including significantly so.

The term "chemical" as used herein can analogously mean or be interchangeable to material, chemical material, ingredient, component, chemical component, element, substance, compound, chemical compound, molecule(s), constituent, and so forth and vice versa. Any 'chemical' discussed in the present disclosure need not refer to a 100% pure chemical. For example, although 'water' may be thought of as H2O, one of skill would appreciate various ions, salts, minerals, impurities, and other substances (including at the ppb level) may be present in 'water'. As used with respect to a chemical, unless specifically indicated otherwise, the singular includes all isomeric forms and vice versa (for example, "hexane", includes all isomers of hexane individually or collectively).

The term "salt" as used herein can refer to an ionic compound. A salt can be formed via a neutralization reaction. A salt can be electrically neutral (i.e., no net charge).

The term "acrylamide" as used herein can be a material identified by CAS Number 79-06-01.

The term "polyacrylamide" (or 'PAM') as used herein can be a material identified by CAS Number 9003-05-08. PAM can be synthesized as a linear copolymer, can be crosslinked, and can be part of a copolymer.

The term "monomer" as used herein can refer to a chemical (or material thereof) characterized as having a molecule (or unit) that can bind to other molecules. Large numbers of monomer units can bind to form polymers. Small numbers of monomer units can combine to form oligomers.

The term "oligomer" as used herein can refer to a molecular complex having a few monomer units (e.g., dimers—two monomers, trimers—three monomers, tetramers—four monomers, etc.).

The term "polymer" as used herein can refer to large molecule (or material thereof) having linked (bonded) monomer units linked. A polymer can be considered to be a chain of monomer units. A polymer can be composed of one or more monomers. Copolymers can refer to a molecule (or material thereof) having two monomers. The polymer chain may be linear or branched. A polymer can be anionic, cationic, non-ionic, and in some instances be a combination. For example, a copolymer may have anionic and cationic properties. 'Polymer' may refer to copolymer.

The term "polymeric", "polymer-based", and the like can refer to a chemical (or material thereof) made of a polymer. "Polymeric-based" as used herein can refer to a chemical or chemical blend (or material thereof) that includes or has a polymeric constituent as part of its compositional makeup. The chemical or blend may be referred to as a composition of matter. The polymeric constituent can be, but need not have to be, copolymeric.

The term "splits", "dry splits", "Guar Gum Split", "guar gum", and other comparable known nomenclature, as used herein can refer to commercially dry guar splits which contain less than 10% moisture. Splits may contain greater or lesser amounts of hull material, the better quality having the lesser amount of hull. Splits can refer to the mucilage found in the seed of the leguminous plant Cyamopsis Tetragonoloba, essentially being refined endosperm derived from the guar seed or cluster bean. It is a non-ionic polysaccharide galacomannan.

The term "hydroxypropyl guar" or "HPG" as used herein can refer to a guar derivative, or a material made from guar. HPG can refer to a propylene glycol ether of guar gum.

The term "high-brine" as used herein can refer to a brine solution having between about 100K ppm to about 300K ppm TDS.

Figure 1:
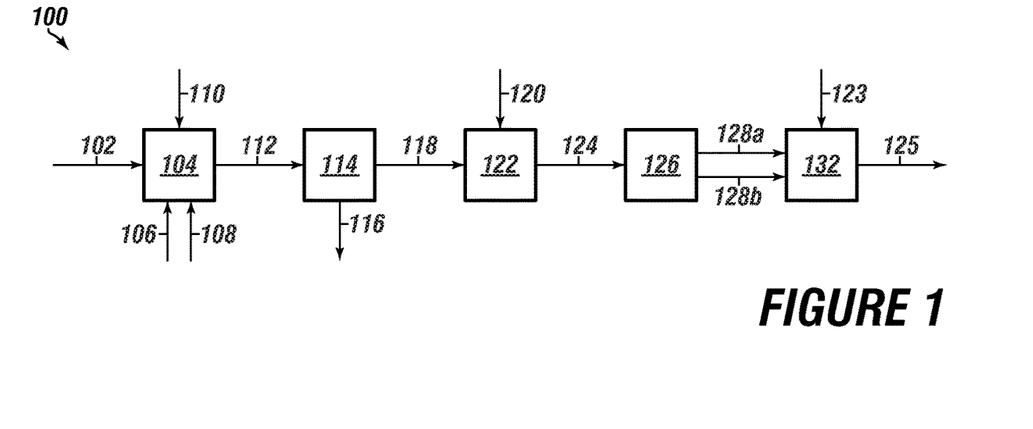
FIG. 1 shows an overview flow diagram of a process for making a composition of matter according to embodiments of the disclosure.

Referring now to FIG. 1, an overview flow diagram of a process for making a composition of matter, in accordance with embodiments disclosed herein, is shown. FIG. 1 illustrates a process 100 suitable for making a chemical product 128 a/b (a-solid, b-liquidious) that may be polymeric-based. The product 128 a/b may equivalently be referred to as 'final product', 'blend product', 'composition of matter', 'additive', and other comparable variations. The composition of matter may be a polymeric-based frac fluid additive.

In this respect the product 128 a/b may be a composition of matter that includes a polymer. Although the use of the product 128 a/b is not meant to be limited, the blend product 128 a/b may be suitable for use as an additive into a water stream (or 'frac water') 123, subsequently forming a frac fluid 125. One of skill in the art would appreciate that the term 'frac fluid' can have a wide meaning, but typically entails a liquid stream—largely water—with various additives added (mixed) therein that is then pumped or injected into a subterranean formation. In aspects, the product 128 a/b may be added into the water 123. The product 128 a/b added may be in solid (a) or liquid (b) form.

The product 128 a/b may be added into the water stream 123 in any manner known in the art, including 'onsite' at a surface facility associated with a frac operation. The product 128 a/b may be characterized as being a friction-reducer whereby the resultant frac fluid 125 may have characteristics of or otherwise promote lower or reduced friction losses as compared to what the fluid 125 would be without the product 128 a/b. The product 128 a/b may be characterized as being a viscosity builder, whereby the resultant frac fluid 125 may have greater proppant carrying capability as compared to what the fluid 125 would be without the product 128 a/b. In aspects, the product 128 a/b may be synergistically characterized as being both a friction reducer and a viscosity builder.

The process 100 has been successfully utilized to make the desirous product 128 a/b, which has been unexpectedly found to be a suitable and desirable alternative to synthetic polymer-based additives especially in the presence of high brine solutions. Thus, in embodiments, the stream 123 may be a high brine solution.

Preliminary Reaction

Preliminary reaction step 104 may include mixing a 'Split' (i.e., guar gum) 102, like that provided by and made commercially available by the Applicant, with other materials, which may include materials useful for forming a guar derivative 112. As just one example, the split 102 may be reacted with a reagent 108, such as propylene oxide. The reaction step 104 may include an aqueous reaction, and thus use water 110, and may further use a catalyst 106 suitable for making guar derivatives, such as caustic (sodium hydroxide). The reaction step 104 may utilize known reactive methods and conditions for forming the derivative 112. In embodiments, the derivative 112 may be hydroxypropyl guar or 'HPG', which may be formed from an aqueous reaction between the split 102 and propylene oxide. The forming of HPG may further include use of sodium hydroxide.

The reaction step 104 may occur in a batch or continuous process, as may be desired. Step 104 may include reagents mixed together with heat and/or agitation. Heating may be in the range of about 120° F. to about 180° F. The reaction step 104 may produce at least an 80% yield of guar derivative 112. In aspects, the yield of resultant derivative may be about 80% to about 95%. Residence or batch reaction time may be about 2 hours, although the time of reaction may be varied to promote a desired yield. In embodiments, the reaction time is about 1.5 hours to about 2.5 hours. The guar derivative 112 may be of at least 80% purity.

Reaction step 104 may occur in an oxygen-free environment. Thus, reaction step 104 may include a vacuum purge. The reaction step 104 may occur in a jacketed pressure vessel.

The guar derivative 112 may be further processed via a secondary treatment step 114 resulting in treated derivative 118, which may be (although not required) higher purity then derivative 112. 'Treatment' is not meant be limited in the sense that derivative 112 may be treated, processed, reacted, etc. in whatever manner may be desired or applicable for process 100. Moreover, the treatment step 114 may include multiple treatments. In a non-limiting example, the guar derivative 112 may be HPG, which may be further washed, and then dried to result in a treated HPG powder.

In embodiments, derivative 112 may be conveyed to a washing section using bean flow control with a weir overflow. After treatment, the intermediate derivative may be transferred, such as by pumping, to shaker configured with a mesh screen. The shaker may be suitable to de-water and classify the derivative.

The intermediate derivative may be transferred to a second wash. For example, by using a weir overflow into a Sharples P-2000 decanter centrifuge containing a discharge beech.

The resultant derivative 118 may be characterized as having a certain degree of substitution. The amount of reagent 108 may be adjusted to achieve a desired degree of substitution in the derivative 118.

Co-Grinding

The resultant derivative 118 may have a gooey, pasty appearance. The derivative 118 may be fed (i.e., transferred, pumped, etc.) to a co-grinding step 122 where it may be mixed with another material 120, which may be an acid.

Grinding 122 may occur via a grinder as would be known to one of skill in the art, such as with a Hammermill. In embodiments, derivative 118 may be collected and fed via a volumetric feeder into a Pulva Hammermill using a 0.015 wedgewire screen for a first pulverizing. Co-grinding step 122 may be occur in a batch or continuous manner. Although co-grinding may occur in substantially dry conditions, it is within the scope of the disclosure that some amount of moisture may be present. In embodiments, grinding step 122 may take place in a heated vacuum system. The vacuum system may include one or more of a combustion burner, a micropulsair dust collector (suitable for use as a dryer), and a blower (suitable for pulling a vacuum).

'Co'-grinding in this sense refers to the grinding together of at least two constituents, in this case the derivative 118 and material 120. Although not meant to be limited to any particular material or acid, suitable acid examples include carboxylic acids (saturated or unsaturated), such as acrylic acid (or propanoic acid), and other organic acids, such as citric, fumaric, and so forth.

After the grinding step, co-ground product 124 may be dried.

It has been unexpectedly discovered that the co-grinding step 122 may be beneficial to the overall process 100 and product 128 a/b.

Typically, fast hydration is especially important in oilfield stimulations, the standard technique being to hydrate a product to full hydration in a large hydration tank as quickly as possible so as to waste as little product as possible. Rapid hydration also enhances fluid pumping performance Fast hydrating guars would be advantageous to simplify the hydration process by eliminating the conventional hydration unit or minimizing it to a very small volume.

Also, by eliminating the hydration unit or minimizing the size of the hydration unit, better real-time control of the fracturing operation could be achieved. Also, fast hydrating product 128 a/b could be added directly in water, a brine, etc. as a powder or dispersed in a solvent and then added to water or other hydrating fluid such as brine.

With respect to guar, and particularly HPG, HPG is normally reacted under caustic conditions; the caustic acts as the catalyst for the reaction with propylene oxide. The resultant product is normally washed after that reaction, but ultimately some caustic remains, which inhibits the hydration of HPG.

It has been unexpectedly discovered that co-grinding powdered acid with powdered HPG may result in a co-ground product 124 having a reduced or lower pH, which may be useful for speeding up hydration rates. Moreover, because acid may be added via step 122, a downstream customer is beneficially alleviated from having to add acid.

The co-ground product 124 may be ground until a predetermined particle size. In embodiments, the co-ground product 124 may have an average particle bulk diameter whereby at least 90% by weight of a given quantity thereof passes through 200-mesh screen (comparably ≤74 microns). Thus, for example, if 10 lbs. of co-ground product 124 was processed through a 200-mesh screen (which may further be agitated or shaken), at least 9 lbs. of product 124 would pass therethrough. In embodiments, co-ground product 124 may gravity fall through a polishing mill for a final sizing specification.

Material moisture content of product 124 and general production speed may be dictated by regulating the combustion exhaust temperature of the combustion burner. This may occur by addition or extraction of hydrated bean using volumetric feeder speed control.

In a non-limiting example, the vacuum system may have parameters of an average operating combustion temperature output of about 600° F., a grinder exhaust temperature in a range of about 175° F. to about 185° F., and a dust collector exhaust temperature range of about 170° F. to about 175° F.

Powder/Liquid Processing

The resultant product 124, or parts thereof, of the co-grinding step 122 may be fed to a processing step 126. Optionally, the co-ground product 124 may be further processed or treated via step 126, which may include settling, washing, drying, wetting, sifting, separating, heating, mixing and any other processing desired to achieve either or both of a dry product 128a or wet/liquidous product 128b.

The dry product 128a may be that which has less than 5% moisture. The wet product 128b may be organic-based, such as a slurrified mixture of resultant product 124 and oil. The wet product 128b may be a homogeneous mixture of about 40% to about 60% by weight of product 124.

Hydration and Final Product

Either of dry product 128a and wet product 128b may be hydrated.

The product 128 a/b may be hydrated upon mixing with water stream 123. The product 128 a/b may have particles of the size according to embodiments herein. In aspects, the individual polymer molecule chains may be tangled, folded, and compacted together. Hydration of the product 128 a/b may include mixing the product 128 a/b with a liquid such as water to expand, separate, untangle, and solubilize the polymer chains. As the polymer hydrates, its molecules unfold into long chains. In general, it may be desirous to hydrate the polymer completely without breaking or damaging the polymer chains with excess shear forces in the mixing process in order to achieve the highest degree of desired product characteristics.

A particular characteristic of interest is hydration rate. In aspects, the product 128 a/b may be able to be hydrated at least about 80% in about one minute or less, or "fast" hydrating. The characteristic may be tested and evaluated by measuring viscosity. That is, a fluid may be tested for viscosity. For example, if a fully hydrated product results in a fluid viscosity of about 100 cp, then a product hydrated to about 80% would have a viscosity of about 80 cp.

Fast hydrating means a much smaller footprint is needed for a hydrating unit.

As shown the product 128 a/b may be mixed with a water stream 123. The product 128 a/b may be referred to as a composition of matter. The water stream 123 may be any type of water (e.g., river water, fresh water, sea water, produced water, etc.) suitable for forming the frac fluid 125. Although not meant to be limited, typically the water-additive mixing step 132 may occur onsite at a frac operation. One of skill would appreciate the mixing step 132 may occur via an inline mixer where the resultant frac fluid 125 is immediately injected (pumped) into the wellbore. Just the same, the frac fluid 125 may be maintained in a storage tank. It is within the scope of the disclosure that the composition of matter stream 128 a/b may be further processed, treated, etc. prior to the mixing step 132.

The product 128 a/b may have a composition of HPG and acid. The concentration of the product 128 a/b (which may be in the form of liquid, liquidous, slurry, or dry solid) in the frac fluid 125 may determine the traits associated with the frac fluid 125. The product 128 a/b desired may depend on the salinity of the water stream 123 available for the frac operation. In embodiments, the blend 128 a/b may be suitable for a salinity value of the water stream 123 in the range of about 100,000 ppm to about 300,000 ppm total dissolved solids (TDS).

Figure 2:
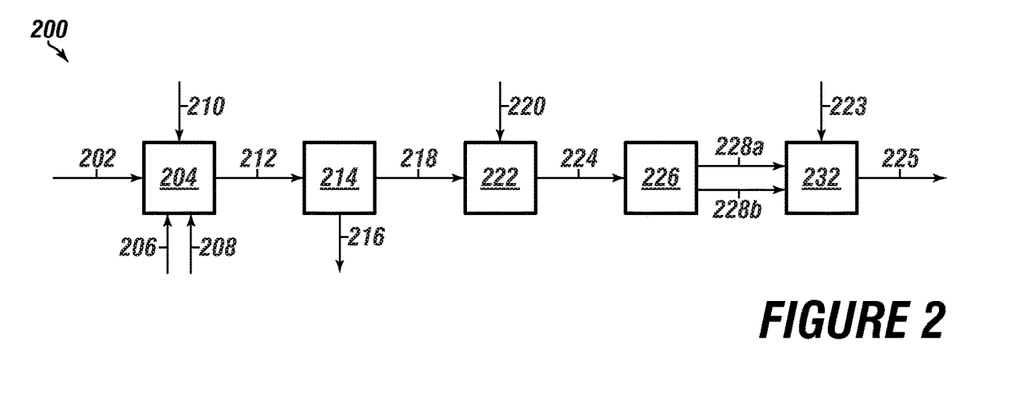
FIG. 2 shows a process flow diagram of a system for making a composition of matter according to embodiments of the disclosure.

Referring now to FIG. 2, a process flow diagram of a system for making and using a composition of matter, in accordance with embodiments disclosed herein, is shown. FIG. 2 illustrates an operative system 200 suitable for the process shown in FIG. 1 (and as described in the accompanying text). Unless expressed otherwise, aspects of system 200 may be like that of the process 100, and thus may only be described in brevity. For example, system 200 may be operated to provide or otherwise produce a chemical blend product 228 a/b that may be polymeric-based and like that of blend 128 a/b. The product 228 a/b may equivalently be referred to as 'final product', 'composition of matter', 'additive', and other comparable variant nomenclature. However, that is not to say that system 200 may not have differences from that of the process.

The composition may be a polymeric-based frac fluid additive. In this respect the product 228 a/b may be a composition of matter that includes a polymer. Although the use of the product 228 a/b is not meant to be limited, the blend product 228 a/b may be suitable for use as an additive into a water stream (or 'frac water') 223, subsequently forming a frac fluid 225. One of skill in the art would appreciate that the term 'frac fluid' can have a wide meaning, but typically entails a liquid stream—largely water—with various additives added (mixed) therein that is then pumped or injected into a subterranean formation. In aspects, the product 228 a/b may be added into the water 223. The product 228 a/b added may be in solid (a) or liquid (b) form.

The product 228 a/b may be added into the water stream 223 in any manner known in the art, including 'onsite' at a surface facility associated with a frac operation. The product 228 a/b may be characterized as being a friction-reducer whereby the resultant frac fluid 225 may have characteristics of or otherwise promote lower or reduced friction losses as compared to what the fluid 225 would be without the product 228 a/b. The product 228 a/b may be characterized as being a viscosity builder, whereby the resultant frac fluid 225 may have greater proppant carrying capability as compared to what the fluid 225 would be without the product 228 a/b. In aspects, the product 228 a/b may be synergistically characterized as being both a friction reducer and a viscosity builder.

The system 200 has been successfully utilized to make the desirous product 228 a/b, which has been unexpectedly found to be a suitable and desirable alternative to synthetic polymer-based additives especially in the presence of high brine solutions. Thus, in embodiments, the stream 223 may be a high brine solution.

Preliminary Reaction

The operation of a reactor 204 may include mixing a 'Split' (i.e., guar gum) 202, like that provided by and made commercially available by the Applicant, with other materials, which may include materials useful for forming a guar derivative 212 product. As just one example, the split 202 may be reacted with a reagent 208, such as propylene oxide. The reactor 204 may include or be used for an aqueous reaction, and thus use water 210, and may further use a catalyst 206 suitable for making guar derivatives, such as caustic (sodium hydroxide). The reactor 204 may utilize known reactive methods and conditions for forming the derivative 212. In embodiments, the derivative 212 may be hydroxypropyl guar or 'HPG', which may be formed from an aqueous reaction between the split 202 and propylene oxide. The forming of HPG may further include use of sodium hydroxide.

The reactor 204 may operate in a batch or continuous process, as may be desired. The reaction within reactor 204 may include reagents mixed together with heat and/or agitation. Heating may be in the range of about 120° F. to about 180° F. The product from the reaction within reactor 204 may produce at least an 80% yield of a guar derivative 212. In aspects, the yield of resultant derivative may be about 80% to about 95%. Residence or batch reaction time may be about 2 hours, although the time of reaction may be varied to promote a desired yield. The guar derivative 212 may be of at least 80% purity.

The reaction within reactor 204 may occur in an oxygen-free environment. Thus, the reactor may include or be operably associated with a vacuum purge. The reactor may be a jacketed pressure vessel.

The guar derivative 212 may be further processed via a secondary treatment operation 214 resulting in treated derivative 218, which may be (although not required) higher purity then derivative 212. 'Treatment' is not meant be limited in the sense that derivative 212 may be treated, processed, reacted, etc. in whatever manner may be desired or applicable for system 200. Moreover, the treatment operation 214 may include multiple treatments. In a non-limiting example, the guar derivative 212 may be HPG, which may be further washed, and then dried to result in a treated HPG powder.

In embodiments, derivative 212 may be conveyed to a washing section using bean flow control with a weir overflow. After treatment, the intermediate derivative may be transferred, such as by pumping, to shaker configured with a mesh screen. The shaker may be suitable to de-water and classify the derivative.

The intermediate derivative may be transferred to a second wash. For example, by using a weir overflow into a Sharples P-2000 decanter centrifuge containing a discharge beech.

The resultant derivative 218 may be characterized as having a certain degree of substitution. The amount of reagent 208 may be adjusted to achieve a desired degree of substitution in the derivative 218.

Co-Grinding

The resultant derivative 218 may have a gooey, pasty appearance. The derivative 218 may be fed (i.e., transferred, pumped, etc.) to a co-grinder 222 where it may be mixed with another material 220, which may be an acid.

Grinder 222 may be a typical grinder as would be known to one of skill in the art, such as with a Hammermill. In embodiments, derivative 218 may be collected and fed via a volumetric feeder into a Pulva Hammermill using a 0.015 wedgewire screen for a first pulverizing. Co-grinder 222 may be operated in a batch or continuous manner Although co-grinding may occur in substantially dry conditions, it is within the scope of the disclosure that some amount of moisture may be present. In embodiments, grinder 222 may include or be operably associated with a heated vacuum system. The vacuum system may include one or more of a combustion burner, a micropulsair dust collector (suitable for use as a dryer), and a blower (suitable for pulling a vacuum).

'Co'-grinding in this sense refers to the grinding together of at least two constituents, in this case the derivative 218 and material 220. Although not meant to be limited to any particular material or acid, suitable acid examples include carboxylic acids (saturated or unsaturated), such as acrylic acid (or propanoic acid), and other organic acids, such as citric, fumaric, and so forth.

After grinding, co-ground product 224 may be dried.

It has been unexpectedly discovered that the use of co-grinder 222 in a particular manner may be beneficial to the overall process 200 and product 228 a/b.

Typically, fast hydration is especially important in oilfield stimulations, the standard technique being to hydrate a product to full hydration in a large hydration tank as quickly as possible so as to waste as little product as possible. Rapid hydration also enhances fluid pumping performance Fast hydrating guars would be advantageous to simplify the hydration process by eliminating the conventional hydration unit or minimizing it to a very small volume.

Also, by eliminating the hydration unit or minimizing the size of the hydration unit, better real-time control of the fracturing operation could be achieved. Also, fast hydrating product 228 a/b could be added directly in water, a brine as a powder or dispersed in a solvent and then added to water or other hydrating fluid such as brine.

With respect to guar, and particularly HPG, HPG is normally reacted under caustic conditions; the caustic acts as the catalyst for the reaction with propylene oxide. The resultant product is normally washed after that reaction, but ultimately some caustic remains, which inhibits the hydration of HPG.

It has been expectedly discovered that co-grinding powdered acid with powdered HPG may result in a co-ground product 224 having a reduced or lower pH, which may be useful for speeding up hydration rates. Moreover, because acid may be added into the co-grinder 222, a downstream customer is beneficially alleviated from having to add acid.

The co-ground product 224 may be ground until a predetermined particle size. In embodiments, the co-ground product 224 may have an average particle bulk diameter whereby at least 90% by weight of a given quantity thereof passes through 200-mesh screen (comparably ≤74 microns). Thus, for example, if 10 lbs. of co-ground product 224 was processed through a 200-mesh screen (which may further be agitated or shaken), at least 9 lbs. of product 224 would pass therethrough. In embodiments, co-ground product 224 may gravity fall through a polishing mill for a final sizing specification.

Material moisture content of product 224 and general production speed may be dictated by regulating the combustion exhaust temperature of the combustion burner. This may occur by addition or extraction of hydrated bean using volumetric feeder speed control.

In a non-limiting example, the vacuum system may have parameters of an average operating combustion temperature output of about 600° F., a grinder exhaust temperature in a range of about 175° F. to about 185° F., and a dust collector exhaust temperature range of about 170° F. to about 175° F.

Powder/Liquid Processing

The resultant product 224, or parts thereof, from the co-grinder 222 may be fed to a subsequent processing operation. Optionally, the co-ground product 224 may be further processed or treated via operation 226, which may include one or more of settling, washing, drying, wetting, sifting, separating, heating, mixing and any other processing desired to achieve either or both of a dry product 228a or wet/liquidious product 228b.

The dry product 228a may be that which has less than 5% moisture. The wet product 228b may be organic-based, such as a slurrified mixture of resultant product 224 and oil. The wet product 228b may be a homogeneous mixture of about 40% to about 60% by weight of product 224.

Hydration and Final Product

Either of dry product 228a and wet product 228b may be hydrated.

The product 228 a/b may be hydrated upon mixing with a water stream 223. The product 228 a/b may have particles of the size according to embodiments herein. In aspects, the individual polymer molecule chains may be tangled, folded, and compacted together. Hydration of the product 228 a/b may include mixing the product 228 a/b with a liquid such as water to expand, separate, untangle, and solubilize the polymer chains. As the polymer hydrates, its molecules unfold into long chains. In general, it may be desirous to hydrate the polymer completely without breaking or damaging the polymer chains with excess shear forces in the mixing process in order to achieve the highest degree of desired product characteristics.

A particular characteristic of interest is hydration rate. In aspects, the product 228 a/b may be able to be hydrated at least about 80% in about one minute or less, or "fast" hydrating. The characteristic may be tested and evaluated by measuring viscosity. That is, a fluid may be tested for viscosity. For example, if a fully hydrated product results in a fluid viscosity of about 100 cp, then a product hydrated to about 80% would have a viscosity of about 80 cp.

Fast hydrating means a much smaller footprint is needed for a hydrating unit.

As shown the product 228 a/b may be mixed with a water stream 223. The product 228 a/b may be referred to as a composition of matter. The water stream 123 may be any type of water (e.g., river water, fresh water, sea water, produced water, etc.) suitable for forming the frac fluid 225. Although not meant to be limited, typically the water-additive mixing may occur in a mixer 232, which may occur onsite at a frac operation. One of skill would appreciate the mixer 232 may be an inline mixer where the resultant frac fluid 225 may be immediately injected (pumped) into the wellbore (not shown here). Just the same, the frac fluid 225 may be maintained in a storage tank (not shown here). It is within the scope of the disclosure that the composition of matter stream 228 a/b may be further processed, treated, etc. prior to being fed to the mixer 232.

The product 228 a/b may have a composition of HPG and acid. The concentration of the product 228 a/b (which may be in the form of liquid, liquidous, slurry, or dry solid) in the frac fluid 225 may determine the traits associated with the frac fluid 225. The product 228 a/b desired may depend on the salinity of the water stream 223 available for the frac operation. In embodiments, the blend 228 a/b may be suitable for a salinity value of the water stream 223 in the range of about 100,000 ppm to about 300,000 ppm total dissolved solids (TDS).

Advantages

Embodiments herein advantageously provide for a composition of matter that has fast hydration characteristics and can also be readily storable and transportable in powder form. Dry HPG is beneficial for friction reducing in rugged conditions, such as high-brine. Dry HPG as a friction reducer provides benefits over polyacrylamides, because it can be readily stored, transported, used, and/or hydrated from its powder form. Hydration need not require large amounts of time or cost-prohibitive equipment.

Embodiments herein provide for a cost-effective, expedient, and scalable process that can be used to make a dry, natural polymer-based friction-reducer additive for a frac fluid, particularly for high-brine.

While embodiments of the disclosure have been shown and described, modifications thereof can be made by one skilled in the art without departing from the spirit and teachings of the disclosure. The embodiments described herein are exemplary only and are not intended to be limiting. Many variations and modifications of the disclosure presented herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of any claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the disclosure. The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A system for making and using a ground product composition of matter, the system comprising:
    a reactor operated with a reaction temperature range of 120° F. to 180° F., wherein
    a guar split and at least one reagent are fed to, and reacted within, the reactor to form a guar derivative;
    a transfer and treatment section operably coupled with the reactor, wherein the guar derivative is treated and transferred;
    a co-grinder operably associated with the transfer and treatment section, whereby the guar derivative is transferred thereto, wherein the co-grinder is further fed an acid, and wherein the co-grinder operates to grind the guar derivative and the acid together to form a ground product characterized by at least 90% by weight of a given quantity thereof having an average particle bulk diameter less than or equal to 74 microns;
    a heated vacuum system operably associated with the co-grinder, the heated vacuum system comprising:
        a combustion burner;
        a dust collector configured for use as a dryer; and
        a blower configured for pulling a vacuum.

2. The system of claim 1, wherein the reactor is operated with a batch reaction time in the range of 1.5 hours to 2.5 hours.

3. The system of claim 1, the system further comprising a caustic feed source comprising a caustic material, wherein the feed source in communication with the reactor, and wherein the caustic material is fed to the reactor, and wherein the acid comprises powdered carboxylic acid.

4. The system of claim 1, the system further comprising:
    a first blend mixer, the first blend mixer operated to mix the ground product with an at least one other constituent to form a blend product.

5. The system of claim 4, the system further comprising:
    a second blend mixer, the second blend mixer operated to mix the blend product with a water stream having a salinity value in the range of about 100,000 ppm to about 300,000 ppm total dissolved solids (TDS).

6. The system of claim 4, wherein the ground product is in substantially dry powdered form.

7. The system of claim 4, wherein the ground product is in slurry or liquidious form.

8. The system of claim 1, wherein the combustion burner is operated with a combustion temperature output of about 600° F., wherein the co-grinder is operated with an exhaust temperature in a range of about 175° F. to about 185° F., and wherein the dust collector is operated with an exhaust temperature range of about 170° F. to about 175° F.

9. The system of claim 8, the system further comprising a hydration unit, wherein the hydration unit is operated to hydrate at least about 80% of the ground product in one minute or less.

10. A system for making and using a ground product composition of matter, the system comprising:
    a reactor operated with a reaction temperature range of 120° F. to 180° F., wherein
    each of a guar split and at least one reagent are fed to, and reacted within, the reactor to form a guar derivative;
    a transfer and treatment section operably coupled with the reactor, wherein the guar derivative is treated and transferred;
    a co-grinder operably associated with the transfer and treatment section, whereby treated guar derivative is transferred thereto, wherein the co-grinder is further fed a powdered acid, and wherein the co-grinder operates to grind the guar derivative and the powdered acid together to form a ground product characterized by at least 90% by weight of a given quantity thereof having an average particle bulk diameter less than or equal to 74 microns, and wherein the co-grinder is operated with an exhaust temperature in a range of about 175° F. to about 185° F.;
    a heated vacuum system operably associated with the co-grinder, the heated vacuum system comprising:
        a combustion burner;
        a dust collector operated a dryer; and
        a blower operated to pull a vacuum on at least one of the reactors and the co-grinder.

11. The system of claim 10, wherein guar derivative is formed with a reaction time in the range of 1.5 hours to 2.5 hours.

12. The system of claim 11, the system further comprising a caustic feed source comprising a caustic material, wherein the feed source in communication with the reactor, wherein the caustic material is fed to the reactor, and wherein the powdered acid comprises carboxylic acid.

13. The system of claim 12, the system further comprising:
    a first blend mixer, the first blend mixer operated to mix the ground product with an at least one other constituent to form a blend product.

14. The system of claim 13, the system further comprising:
    a second blend mixer, the second blend mixer operated to mix the blend product with a water stream having a salinity value in the range of about 100,000 ppm to about 300,000 ppm total dissolved solids (TDS).

15. The system of claim 14, wherein the ground product is in substantially dry powdered form.

16. The system of claim 14, wherein the ground product is in slurry or liquidious form.

17. The system of claim 14, wherein the combustion burner is operated with a combustion temperature output of about 600° F.

18. The system of claim 14, the system further comprising a hydration unit, wherein the hydration unit is operated to hydrate at least about 80% of the ground product in one minute or less.

* * * * *